US009799334B2

(12) United States Patent
Lee

(10) Patent No.: US 9,799,334 B2
(45) Date of Patent: Oct. 24, 2017

(54) SPEECH RECOGNITION APPARATUS, VEHICLE INCLUDING THE SAME, AND METHOD OF CONTROLLING THE SAME

(71) Applicant: HYUNDAI MOTOR COMPANY, Seoul (KR)

(72) Inventor: Jin Ho Lee, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/879,026

(22) Filed: Oct. 8, 2015

(65) Prior Publication Data
US 2016/0180846 A1 Jun. 23, 2016

(30) Foreign Application Priority Data
Dec. 17, 2014 (KR) .................. 10-2014-0182446

(51) Int. Cl.
G10L 15/00 (2013.01)
G10L 15/22 (2006.01)
B60R 16/037 (2006.01)

(52) U.S. Cl.
CPC .......... *G10L 15/22* (2013.01); *B60R 16/0373* (2013.01); *G10L 2015/221* (2013.01)

(58) Field of Classification Search
USPC ................ 704/246, 247, 251, 252
See application file for complete search history.

(56) References Cited

U.S. PATENT DOCUMENTS 6,504,905 B1 * 1/2003 Tsai ................. G10L 25/69
375/224
7,024,366 B1 * 4/2006 Deyoe .................. G10L 15/22
704/246

(Continued)

FOREIGN PATENT DOCUMENTS

JP H09311692 A 12/1997
JP 2002-189487 A 7/2002

(Continued)

OTHER PUBLICATIONS

English translation of Korean Notice of Allowance dated Jul. 8, 2016 issued in Korean Patent Application No. 10-2014-0182446.

(Continued)

*Primary Examiner* — Leonard Saint Cyr
(74) *Attorney, Agent, or Firm* — McDermott Will & Emery LLP

(57) ABSTRACT

A speech recognition apparatus includes a voice collection unit configured to collect voices, and a controller configured to control recognizing a speech based on signals of the voices collected during a predetermined time period from a voice collection start time, identifying whether a signal is received during the predetermined time period when an operation command corresponding to the recognized speech is not identified, determining that an early utterance occurs upon determination that the signal is received during the predetermined time period, counting a number of times of the speech recognition failure occurring by the early utterance, re-performing speech recognition when the counted number of times is less than a reference number of times, and outputting early utterance habit guidance information when the counted number of times is the same as the reference number of times.

17 Claims, 14 Drawing Sheets

(56) References Cited

U.S. PATENT DOCUMENTS

| | | | |
|---|---|---|---|
| 7,212,966 B2 * | 5/2007 | Kyomitsu | G10L 15/20 340/540 |
| 9,236,048 B2 * | 1/2016 | Li | G10L 15/04 |
| 9,280,969 B2 * | 3/2016 | Li | G10L 15/063 |
| 2003/0023432 A1 * | 1/2003 | Kyomitsu | G10L 15/20 704/231 |
| 2005/0015197 A1 * | 1/2005 | Ohtsuji | G01C 21/34 701/533 |
| 2005/0049859 A1 * | 3/2005 | Arun | G10L 15/22 704/231 |
| 2006/0241948 A1 * | 10/2006 | Abrash | G10L 25/87 704/275 |
| 2011/0246189 A1 * | 10/2011 | Fox | G06F 3/165 704/210 |
| 2013/0289995 A1 * | 10/2013 | Li | G10L 15/04 704/254 |

FOREIGN PATENT DOCUMENTS

| | | |
|---|---|---|
| JP | 2011-145610 A | 7/2011 |
| KR | 10-0281582 B1 | 2/2001 |
| KR | 10-2006-0007148 A | 1/2006 |
| KR | 10-2014-0047985 A | 4/2014 |

OTHER PUBLICATIONS

Korean Office Action dated Dec. 28, 2015 issued in Korean Patent Application No. 10-2014-0182446.

* cited by examiner

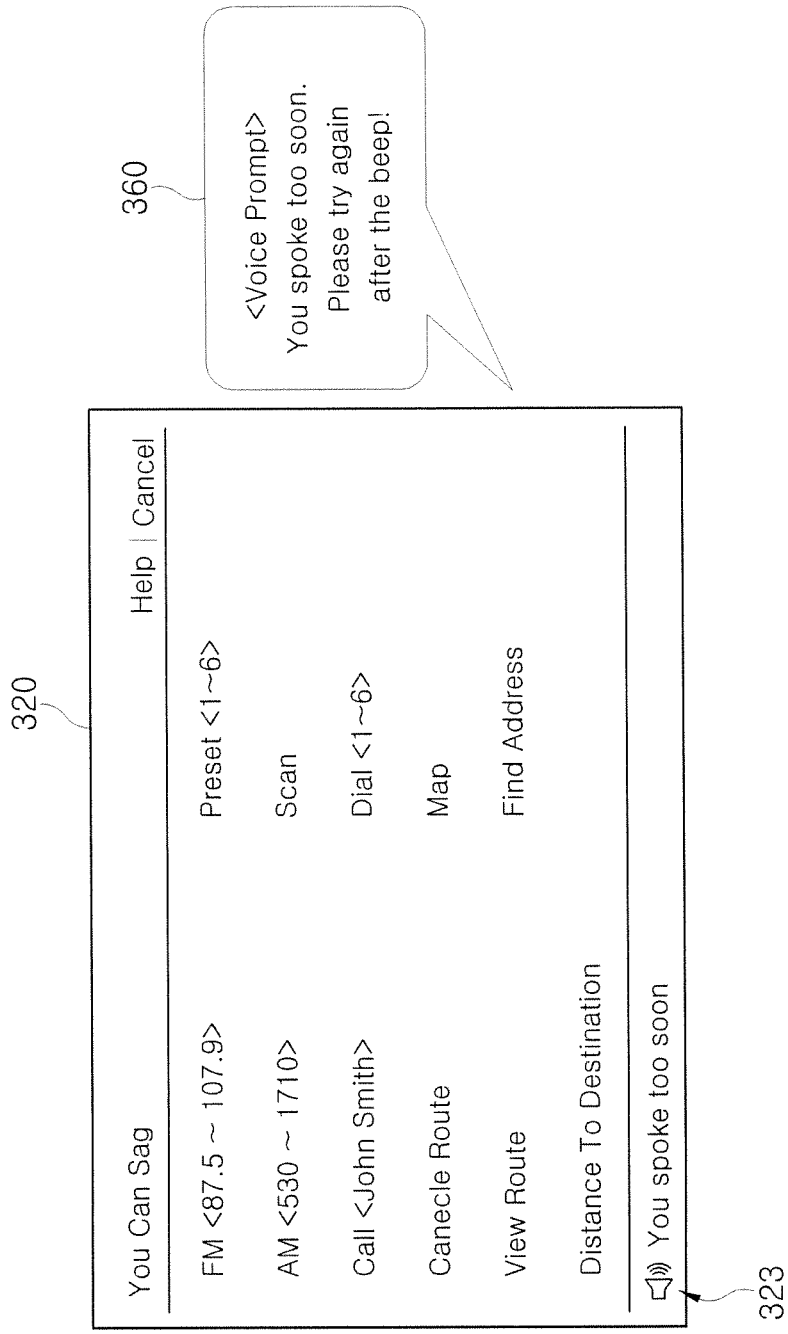

SPEECH RECOGNITION APPARATUS, VEHICLE INCLUDING THE SAME, AND METHOD OF CONTROLLING THE SAME

CROSS-REFERENCE TO RELATED APPLICATION(S)

This application claims priority to and the benefit of Korean Patent Application No. 2014-0182446, filed on Dec. 17, 2014 in the Korean Intellectual Property Office, the disclosure of which is incorporated herein by reference.

TECHNICAL FIELD

Embodiments of the present disclosure relate to speech recognition apparatuses to increase a speech recognition rate, vehicles including the same, and methods of controlling the speech recognition apparatuses.

BACKGROUND

In general, talking on a cell phone while driving a vehicle requires several simple stages including pressing buttons or touching the cell phone in a hand-held state, and talking on the cell phone with a counterpart while holding the cell phone to an ear of the driver.

Unless the vehicle stops or parks at a place, at least one of the hands of the driver needs to hold the cell phone while talking on the cell phone.

In this case, since the driver may have a narrow field of view and cannot pay full attention to objects nearby, the vehicle may deviate from a travel lane, and reaction time on the brake pedal may increase, causing increase of traffic accidents.

A hands-free device is a device used together with a cell phone that allows the driver to talk on the phone without holding the cell phone to reduce the provability of car accidents.

That is, the driver may talk on the phone without holding the cell phone by mounting a hands-free device including a microphone and an ear phone (or speaker) to a vehicle and connecting the hands-free device with the cell phone via a cable.

However, due to inconvenience of directly connecting the hands-free device with the cell phone by using the cable, Bluetooth devices using Near Field Communications (NFC) have been developed in recent years.

A Bluetooth device includes a microphone and an ear phone (or speaker) and communicates with the cell phone wirelessly.

The hands-free device and Bluetooth device perform transmission and reception of voices of a user and a counterpart while performing speech recognition by collecting a voice of the user and communicating with the cell phone based on an operation command corresponding to a recognized speech.

In this regard, the hands-free device and Bluetooth device transmit voice signals of the user to the cell phone and output voice signals of the counterpart received from the cell phone via a speaker.

In addition, speech recognition may also be used to control operation of electronic apparatuses installed in the vehicle such as a multimedia playback apparatus and an air conditioner.

For example, the multimedia playback apparatus recognizes a speech of the user, determines an operation command corresponding to the recognized speech, and performs at least one function based on the determined operation command.

When speech recognition is used to control operation of at least one electronic apparatus as described above, a speech recognition rate may be reduced due to noise from roads or noise signals from internal machines inside the vehicle.

SUMMARY

Therefore, it is an aspect of the present disclosure to provide speech recognition apparatuses determining whether an early utterance of a user occurs during speech recognition, and outputting early utterance guidance information in case of the early utterance, a vehicle including the same, and a method of controlling the same.

It is another aspect of the present disclosure to provide speech recognition apparatuses distinguishing a voice signal of an early utterance from a noise signal, a vehicle including the same, and a method of controlling the same.

Additional aspects of the disclosure will be set forth in part in the description which follows and, in part, will be obvious from the description, or may be learned by practice of the disclosure.

In accordance with one aspect of the present disclosure, a speech recognition apparatus includes a voice collection unit configured to collect voices, and a controller configured to control recognizing a speech based on signals of the voices collected during a predetermined time period from a voice collection start time, identifying whether a signal is received during the predetermined time period when an operation command corresponding to the recognized speech is not identified, determining that a speech recognition failure occurs by an early utterance upon determination that the signal is received during the predetermined time period, and outputting information about the speech recognition failure by the early utterance.

The controller may control counting a number of times of the speech recognition failure, re-requesting speech recognition when the counted number of times is less than a reference number of times, and outputting early utterance habit guidance information when the counted number of times is the same as the reference number of times.

The speech recognition apparatus may further include an input unit configured to receive a start command for starting speech recognition, and the controller may output utterance instruction guidance information and an operation command for operating the voice collection unit upon receiving the start command signal for speech recognition.

The controller may control outputting the identified operation command upon identifying the operation command corresponding to the recognized speech.

When the operation command corresponding to the recognized speech is identified and a signal is received during the predetermined time period, the controller may process the signal received during the predetermined time period as a noise.

When the operation command corresponding to the recognized speech is not identified and a signal is not received during the predetermined time period, the controller may output information about a command error.

The controller may control outputting a beep sound in the re-requesting of speech recognition.

In accordance with another aspect of the present disclosure, a vehicle includes a speech recognition apparatus, and at least one device, operation of which is controlled based on an operation command corresponding to a speech recognized by the speech recognition apparatus, wherein the speech recognition apparatus includes a voice collection unit configured to collect voices, and a controller configured to control recognizing a speech based on signals of the voices collected during a predetermined time period from a voice collection start time, identifying whether a signal is received during the predetermined time period when an operation command corresponding to the recognized speech is not identified, determining that a speech recognition failure occurs by an early utterance upon determination that the signal is received during the predetermined time period, and outputting information about the speech recognition failure by the early utterance.

The speech recognition apparatus may further include an input unit configured to receive a start command for starting speech recognition, and the controller may sequentially control outputting voice guidance information for guiding an utterance instruction process, outputting a beep sound to guide a time for preparing an utterance, and outputting an operation command for operating the voice collection unit upon receiving the start command signal for speech recognition.

The controller may recognize a time after a predetermined time period from a time at which the operation command for operating the voice collection unit is output as a voice collection start time, and start receiving signals of the collected voice.

When the operation command corresponding to the recognized speech is identified, the controller may control outputting the identified operation command to the at least one device.

When the operation command corresponding to the recognized speech is identified and a signal is received during the predetermined time period, the controller may process the signal received during the predetermined time period as a noise, and when the operation command corresponding to the recognized speech is not identified and a signal is not received during the predetermined time period, the controller may determine that a command error occurs and control outputting information about the command error to the at least one device.

The controller may control counting a number of times of the speech recognition failure, re-requesting speech recognition when the counted number of times is less than a reference number of times, and outputting early utterance habit guidance information when the counted number of times is the same as the reference number of times.

The vehicle may further include a sound output unit, controlled by the controller, for outputting configured to output the early utterance habit guidance information.

The controller may control transmitting the early utterance habit guidance information to the at least one device.

The controller may control outputting a beep sound to guide a time for preparing the utterance in the re-requesting of speech recognition.

The vehicle may further include a sound output unit configured to output information about the re-requesting of speech recognition and the beep sound.

The controller may control outputting the early utterance habit guidance information by estimating occurrence of no leading silence (NLS) by early utterance when the counted number of times is one and confirming occurrence of NLS by early utterance when the counted number of times is two.

The vehicle may further include a display unit configured to display the early utterance habit guidance information.

In accordance with another aspect of the present disclosure, a method of controlling a speech recognition apparatus configured to receive a command to control operation of a plurality of devices installed in a vehicle includes determining whether a start command signal for speech recognition is received, operating a voice collection unit upon determination that the start command signal for speech recognition is received, determining whether a predetermined time period has lapsed from a voice collection start time, recognizing a speech based on signals of voices collected from a time after the predetermined time period, identifying an operation command corresponding to the recognized speech, identifying whether a signal is received during the predetermined time period when the operation command corresponding to the recognized speech is not identified, determining that a speech recognition failure occurs by an early utterance upon determination that the signal is received during the predetermined time period, and outputting information about the speech recognition failure by the early utterance.

The method may further include outputting voice guidance information for guiding an utterance instruction process upon receiving the start command signal for speech recognition.

The method may further include outputting a beep sound to guide a time for preparing an utterance when the outputting of the voice guidance information is complete.

The method may further include outputting an operation command for operating the voice collection unit when the outputting of the beep sound is complete, and recognizing a time after a predetermined time period from a time at which the operation command for operating the voice collection unit is output as a voice collection start time.

The method may further include outputting the identified operation command to one of the plurality of devices installed in the vehicle when the operation command corresponding to the recognized speech is identified.

The method may further include processing a signal received during the predetermined time period as a noise when the operation command corresponding to the recognized speech is identified and the signal is received during the predetermined time period.

The method may further include counting a number of times of the speech recognition failure by the early utterance, outputting a beep sound to re-perform speech recognition when the counted number of times is less than a reference number of times, and outputting early utterance habit guidance information when the counted number of times is the same as the reference number of times.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 13 is an exemplary view of displaying early utterance guidance information of a multimedia playback apparatus communicating with a speech recognition apparatus according to an exemplary embodiment.

DETAILED DESCRIPTION

Figure 1:
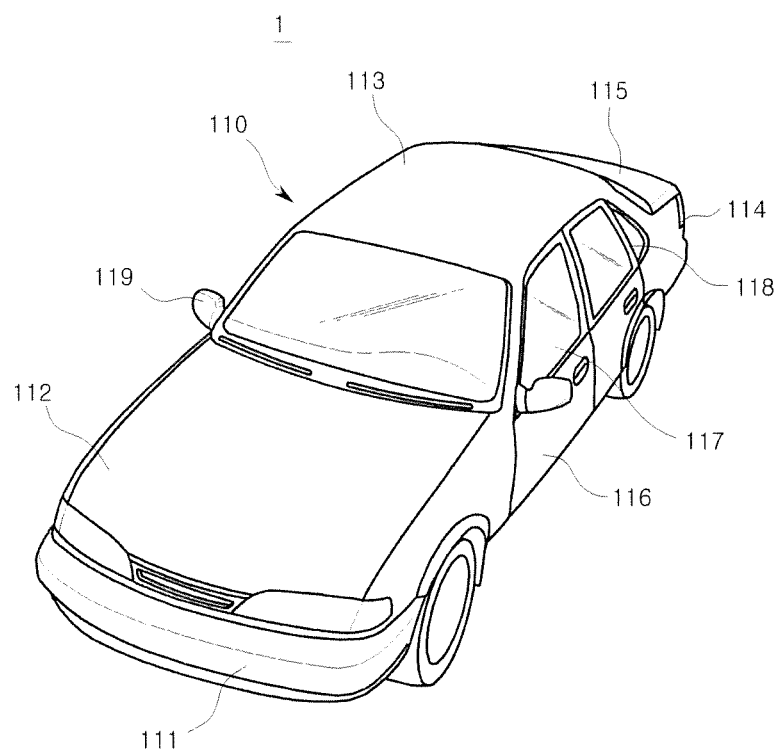
FIG. 1 is an exterior view of a vehicle including a speech recognition apparatus according to an exemplary embodiment.

Reference will now be made in detail to the embodiments of the present disclosure, examples of which are illustrated in the accompanying drawings, wherein like reference numerals refer to like elements throughout.

Figure 2:
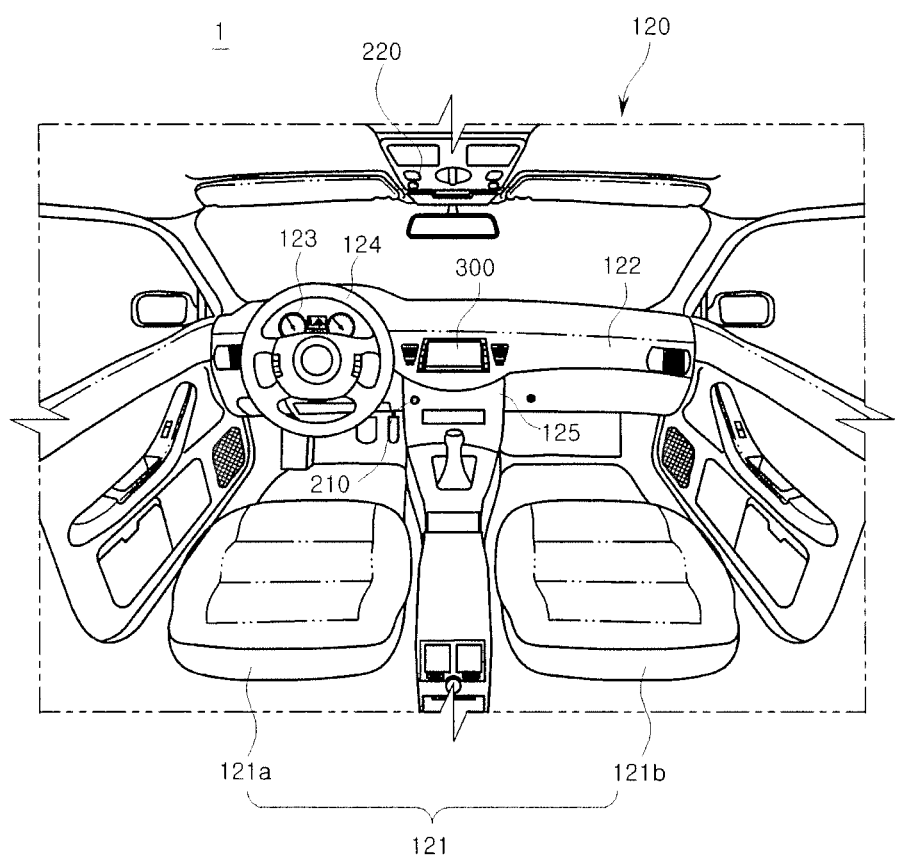
FIG. 2 is an interior view of a vehicle including a speech recognition apparatus according to an exemplary embodiment.

FIG. 1 is an exterior view of a vehicle including a speech recognition apparatus according to an exemplary embodiment. FIG. 2 is an interior view of a vehicle including a speech recognition apparatus according to an exemplary embodiment.

A vehicle 1 is a mobile machine that transports people or cargo and travels on roads by driving wheels.

The vehicle 1 includes a body defining an interior and an exterior thereof and a chassis constituting the other portions except for the body and including mechanical devices required for driving.

As illustrated in FIG. 1, an exterior 110 of the body may include a front panel 111, a hood 112, a roof panel 113, a rear panel 114, a trunk 115, left/right front and rear doors 116, and window glass 117 installed at the left/right front and rear doors 116 and opened and closed according to user's preference.

The exterior 110 of the body may further include fillers 118 disposed at boundaries between the front panel 111, the hood 112, the rear panel 114, the trunk 115, and left/right front and rear window glass 117.

In addition, the window glass 117 further includes side window glass, quarter window glass installed between fillers not to be open, real window glass disposed at the rear side, and front window glass disposed at the front side.

The exterior 110 of the body may further include side mirrors 119 configured to provide a driver with rear views of the vehicle 1.

As illustrated in FIG. 2, an interior 120 of the body may be provided with seats 121 on which the driver and passengers sit, a dashboard 122, an instrument cluster 123 disposed on the dashboard 122 and including a tachometer, speedometer, coolant thermometer, fuel gauge, directional indicator light, high beam indicator light, warning light, seat belt warning light, trip meter, odometer, automatic transmission selector lever indicator light, door open warning light, engine oil warning light, and low fuel warning light, a steering wheel 124 configured to manipulate direction of the vehicle 1, and a center fascia 125 in which an audio control panel and an air conditioner control panel are installed.

The seats 121 includes a driver's seat 121a on which the driver sits, a front passenger's seat 126b, and back seats.

The instrument cluster 123 may be implemented in a digital manner.

That is, the instrument cluster 123 implemented in a digital manner displays information about the vehicle 1 and driving information as images.

The center fascia 125 is located at a central position of the dashboard 122 between the driver's seat 121a and the front passenger's seat 121b and includes a head unit to control an audio device, an air conditioner, and a heater.

The center fascia 125 may be provided with a speech recognition apparatus 200 (not shown in FIG. 2) configured to control operation of the audio device, the air conditioner, and the heater by using a voice.

The speech recognition apparatus 200 includes an input unit 210 configured receive a start command for starting speech recognition from a user and a voice collection unit 220 configured to collect voices of the user.

In this regard, the input unit 210 may be installed at a region reachable by a driver's hand, and the voice collection unit 220 may be installed in a direction toward a driver's utterance.

For example, the input unit 210 may be mounted at the center fascia 125, and the voice collection unit 220 may be mounted at a position adjacent to a room mirror.

The speech recognition apparatus 200 will be described later in more detail.

In addition, vents of the air conditioner, a cigar jack, and a multimedia playback apparatus 300 such as an audio video navigation (AVN) apparatus may be installed in the center fascia 125.

In this regard, the multimedia playback apparatus 300 may be installed on the dashboard 122 as a mounted-type.

The multimedia playback apparatus 300 may perform an audio function by outputting audio signals, a video function by outputting video signals, and a navigation function by computing a current position of the vehicle 1 based on location information received from a plurality of satellites and displaying the current position of the vehicle 1 on a matched point of a map.

The navigation function refers to the ability to guide a user to a destination from a current position along a route by receiving a user's input of the destination, searching for the route from the current position to the destination based on route search algorithm, and displaying the found route on a matched point of a map.

The multimedia playback apparatus 300 may also receive an operation command via speech recognition to perform the audio and video functions.

The multimedia playback apparatus 300 may also receive an operation command, an address of the destination, or a search command for searching for one of a plurality of pre-stored addresses via speech recognition to perform the navigation function.

The multimedia playback apparatus 300 may also output information corresponding to results of speech recognition as an image or sound via communication with the speech recognition apparatus 200.

The multimedia playback apparatus 300 will be described in more detail later.

The chassis of the vehicle 1 may include a power generation apparatus, a power transmission apparatus, a driving apparatus, a steering apparatus, a brake apparatus, a suspension apparatus, a transmission apparatus, a fuel supply apparatus, left/right front and rear wheels, and the like.

The vehicle 1 may also be provided with various safety apparatuses for the safety of the driver and passengers.

Examples of the safety apparatus of the vehicle 1 include an airbag control apparatus for the purpose of safety of the driver and passengers in a collision of the vehicle 1 and an electronic stability control (ESD) to control a balance of the vehicle 1 during acceleration, deceleration, or cornering.

The vehicle 1 may further include a sensing apparatus such as a proximity sensor to detect obstacles or another vehicle present at lateral sides and a rear side of the vehicle and a rain sensor to sense an amount of water.

The vehicle 1 may further include electronic devices installed for the convenience of the driver, such as a hands-free device, a global positioning system (GPS) device, a Bluetooth device, a rear view camera, a mobile terminal charging device, and a high pass device.

The Bluetooth device may also receive an operation command via speech recognition.

The vehicle may further include a start/stop button to input an operation command to a starter motor (not shown). That is, when the start/stop button is turned on, the vehicle operates the starter motor (not shown) and drives an engine (not shown) that is a power generating apparatus via operation of the starter motor.

The vehicle may further include a battery (not shown) connected to the multimedia playback apparatus, audio device, a vehicle interior light, a starter motor, and other electronic devices to supply driving power.

The battery is charged using a power generator or driving power of the engine during driving of the vehicle.

Figure 3:
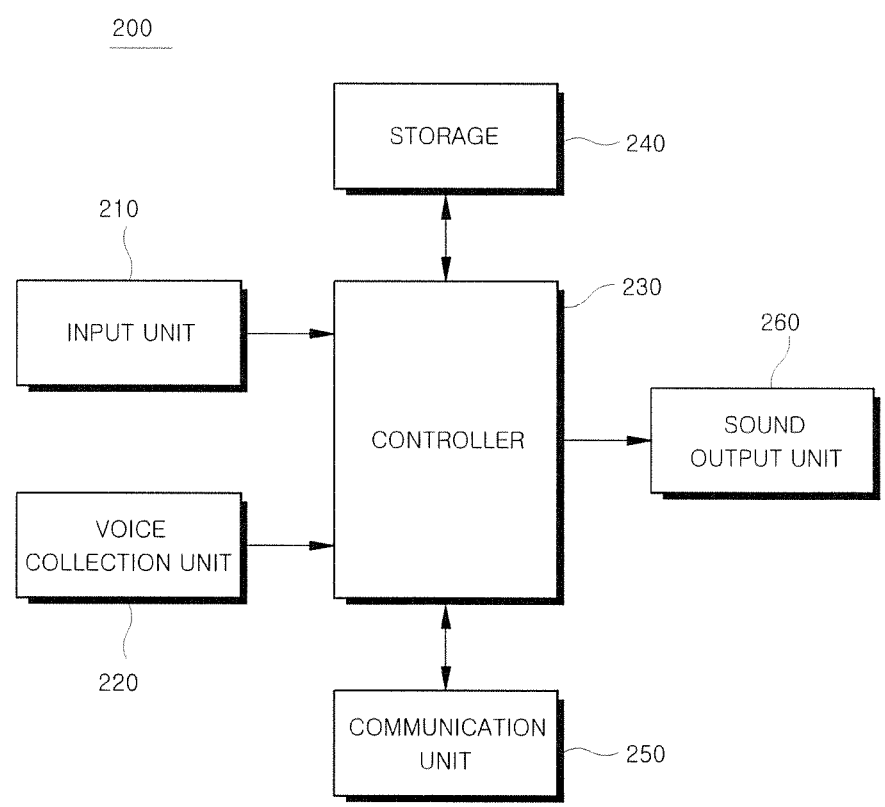
FIG. 3 is a control block diagram illustrating a speech recognition apparatus according to an exemplary embodiment.
Figure 4:
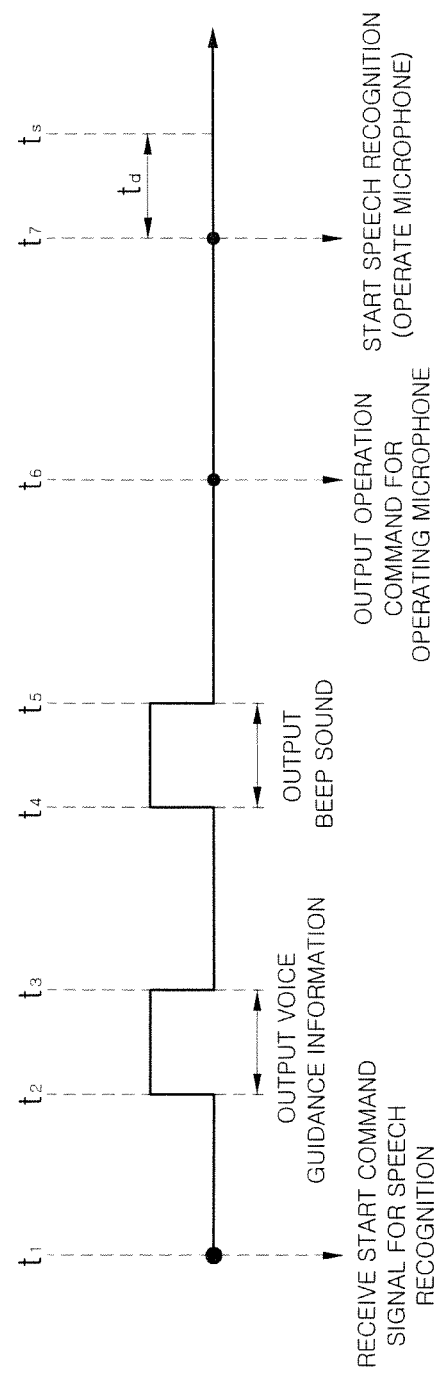
FIG. 4 is a diagram illustrating operation of a speech recognition apparatus according to an exemplary embodiment.

FIG. 3 is a control block diagram illustrating a speech recognition apparatus according to an exemplary embodiment. FIG. 4 is a diagram illustrating an operation of a speech recognition apparatus according to an exemplary embodiment.

Referring to FIG. 3, a speech recognition apparatus 200 includes an input unit 210, a voice collection unit 220, a controller 230, a storage 240, and a communication unit 250. The speech recognition apparatus 200 may further include a sound output unit 260.

Referring back to FIG. 2, the input unit 210 is disposed at the center fascia 125 of the dashboard 122 or at the steering wheel 124 and receives a Speech Recognition ON Command or OFF Command from the user.

That is, the input unit 210 receives a start command for starting speech recognition from the user and outputs a start command signal for speech recognition corresponding to the start command.

The input unit 210 may be a button that may be pressed, a touch pad that may be touched, or a proximity sensor that senses a nearby hand.

The input unit 210 may vary according to purposes of speech recognition.

For example, the purposes of speech recognition may be to make a call, to control operation of the multimedia playback apparatus, to control operation of the air conditioner, to control operation of heating coils of the seat, to control operation of a radio, and the like.

In this regard, the multimedia playback apparatus 300 may have a radio function, a DMB function, a navigation function, a contents reproducing function, a music reproducing function, and the like.

The voice collection unit 220 collects voices, detects sound waves of the collected voices, generates electric signals corresponding to the sound waves, and transmits the generated electric signals to the controller 230.

That is, the voice collection unit 220 transmits signals of the collected voices to the controller 230.

The voice collection unit 220 includes a microphone installed at the driver's seat 121*a* side such that a voice collection direction thereof faces the driver's seat 121*a*.

The voice collection unit 220 may include one microphone or a microphone array. The one microphone may be directional.

The voice collection unit 220 may further include an auxiliary microphone installed at the front passenger's seat 121*b* side such that a voice collection direction thereof faces the front passenger's seat 121*b*.

The voice collection unit 220 may perform or stop voice collection based on an operation command of the controller 230.

Upon determination that the start command signal for speech recognition is received, the controller 230 controls outputting utterance instruction guidance information.

In this regard, the start command signal for speech recognition may be a button signal input via a pressed button, a touch signal input via a touch pad, a gesture signal input via a touch pad, or a proximity signal input by a nearby hand via a proximity sensor.

The utterance instruction guidance information includes voice guidance information to guide an utterance instruction process and a beep sound to guide a time for preparing an utterance.

That is, the controller 230 may control operation of the sound output unit 260 to output the voice guidance information and the beep sound.

Upon determination that the start command signal for speech recognition is input, the controller 230 performs an on-control operation of the voice collection unit 220 to start speech recognition. Once the speech recognition is complete, the controller 230 performs an off-control operation of the voice collection unit 220 to stop the speech recognition.

Operation of the controller 230 to start speech recognition will be described with reference to FIG. 4.

As illustrated in FIG. 4, the start command signal for speech recognition is received at a first time t1. The controller 230 controls outputting voice guidance information at a second time t2 after a predetermined time period from the first time t1, controls outputting a beep sound at a fourth time t4 after a predetermined time period from a third time t3 at which outputting the voice guidance information is completed, controls outputting an operation command for operating the microphone at a sixth time t6 after a predetermined time period from a fifth time t5 at which outputting the beep sound is completed, and starts speech recognition at a seventh time t7 after a predetermined time period from the sixth time t6.

Here, each of the predetermined time periods between the times t1 to t7 may vary.

The voice guidance information may be output only when the start command signal for speech recognition is received.

In addition, the seventh time t7 is a voice collection start time at which the microphone starts operation as the operation command is input to the microphone of the voice collection unit.

The controller 230 performs speech recognition based on signals of the collected voice from a time is after a predetermined time period td from the seventh time t7 at which the operation of the microphone started.

In this regard, the predetermined time period td is about 100 ms during which noise signals from the inside the speech recognition apparatus 200 and noise signals from the interior and exterior of the vehicle are mainly received right after operation of the microphone is started.

When a signal is received during a predetermined time, the controller 230 generates a No Leading Silence (NLS) flag.

More particularly, the controller 230 recognizes a speech by extracting feature vectors included in voice signals by computing frequency characteristics of the voice signals on a frame basis during speech recognition, identifying phonemes of the voice signals by comparing a vector sequence of the extracted feature vectors with that of a pre-stored acoustic model, and converting the identified phonemes into words constituting a context.

In this regard, vector sequences of feature vectors of the phonemes are stored in the acoustic model.

The controller 230 matches information about the converted context with reference context information on the operation command basis to identify a matching rate, determines that the speech recognition is successful upon determination that there is reference context information having a matching rate greater than the reference matching rate, identifies the reference context information having the matching rate greater than the reference matching rate, and identifies an operation command corresponding to the identified reference context information.

That is, the controller 230 identifies whether an operation command corresponding to the recognized speech exists.

In addition, when a plurality of pieces of reference context information having matching rates greater than the reference matching rate are found, the controller 230 identifies one piece of reference context information having the highest matching rate.

When a signal is not received during the predetermined time period, and no reference context information having a matching rate greater than the reference matching rate is found, the controller 230 determines that a misrecognition occurs and controls outputting information about the misrecognition.

When a signal is received during the predetermined time period, and no reference context information having a matching rate greater than the reference matching rate is found, the controller 230 determines that a speech recognition failure occurs by an early utterance and controls outputting information about the early utterance.

When a signal is received during the predetermined time period, and reference context information having a matching rate greater than the reference matching rate is found, the controller 230 determines that a noise signal is received during the predetermined time period and processes the received noise signal.

In this regard, the processing of the noise signal includes ignoring the noise signal.

As described above, the controller 230 may determine whether the signal received during the predetermined time period is a noise signal or a voice signal of the early utterance based on whether or not a signal is received during the predetermined time period after the speech recognition is started and whether or not the speech recognition is successful.

In addition, upon determination that a speech recognition failure occurs by the early utterance, the controller 230 controls outputting utterance re-requesting information.

When the number of times of the early utterance is greater than a pre-set reference number of times, the controller 230 may control outputting early utterance guidance information regarding a habit of early utterance.

Here, the reference number of times may be two.

For example, the controller 230 controls outputting the early utterance habit guidance information by estimating occurrence of no leading silence (NLS) by an early utterance when the counted number of times is one and confirming occurrence of NLS by the early utterance when the counted number of times is two.

The controller 230 may identify an external device and an operation command corresponding to the recognized speech and may control operation of the communication unit 250 to transmit the operation command to the identified external device.

For example, when a speech related to a phone call is recognized, the controller 230 may control the communication unit 250 to transmit the identified operation command to a cell phone via a Bluetooth device. When a speech related to an operation control of the multimedia playback apparatus 300 is recognized, the controller 230 controls the communication unit 250 to transmit the identified operation command to the multimedia playback apparatus 300. When a speech related to an operation control of the air conditioner is recognized, the controller 230 controls the communication unit 250 to transmit the identified operation command to the air conditioner.

The controller 230 may control operation of the communication unit 250 such that information about recognized speech to the external device.

For example, when the speech related to a phone call is recognized, the controller 230 may control the communication unit 250 to transmit information about the recognized speech to a cell phone via a Bluetooth device. When the speech related to an operation control of the multimedia playback apparatus 300 is recognized, the controller 230 controls the communication unit 250 to transmit information about the recognized speech to the multimedia playback apparatus 300. When the speech related to an operation control of the air conditioner is recognized, the controller 230 controls the communication unit 250 to transmit information about the recognized speech to the air conditioner.

The storage 240 stores the reference number of times of the early utterance to judge the early utterance habit.

The storage 240 stores information about a plurality of devices controlled by speech recognition.

The storage 240 may store devices and operation commands corresponding to recognized speeches.

In this regard, the storage 240 stores reference context information on an operation command basis and further stores reference matching rates thereof.

The communication unit 250 communicates with devices installed in the vehicle in a wired or wireless network.

Here, the devices installed in the vehicle may be devices installed outside the speech recognition apparatus 200 such as a Bluetooth device, an audio device, an air conditioner, and the multimedia playback apparatus 300.

In response to commands of the controller 230, the sound output unit 260 outputs the voice guidance information and the beep sound before starting speech recognition and early utterance habit information corresponding to results of a speech recognition failure, or the like as sound.

In addition, if the sound output unit 260 is not used, the speech recognition apparatus 200 may transmits an output command for outputting the voice guidance information, an output command for outputting the beep sound, and an output command for outputting early utterance habit information to the multimedia playback apparatus 300 or the audio device.

The speech recognition apparatus 200 may be disposed inside devices installed in the vehicle. That is, the speech recognition apparatus 200 may be installed in the Bluetooth device, the audio device, the air conditioner, or the multimedia playback apparatus 300.

Figure 5:
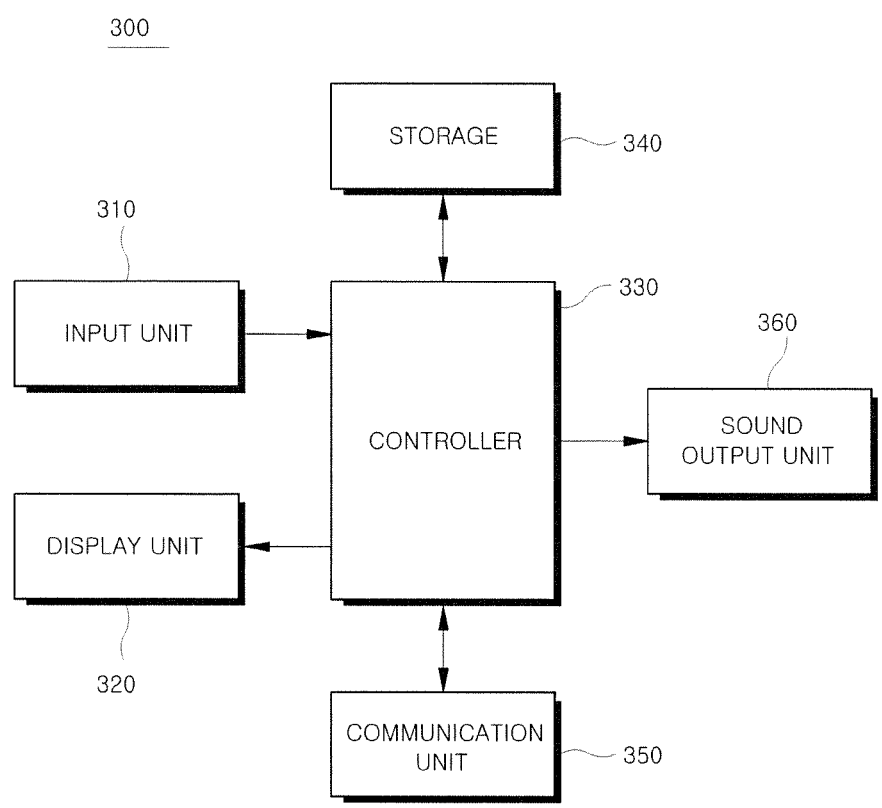
FIG. 5 is a control block diagram illustrating a multimedia playback apparatus communicating with a speech recognition apparatus according to an exemplary embodiment.

FIG. 5 is a control block diagram illustrating an external device communicating with a speech recognition apparatus according to an exemplary embodiment. The multimedia playback apparatus 300 will be descried as an example of the external device.

The multimedia playback apparatus 300 includes an input unit 310, a display unit 320, a controller 330, a storage 340, a communication unit 350, and a sound output unit 360.

The input unit 310 may be implemented as a touch panel, and the display unit 320 may be implemented as a flat panel display panel such as an LCD.

That is, the input unit 310 and the display unit 320 of the multimedia playback apparatus 300 may be implemented as a touchscreen in which a touch panel and a flat panel display panel are integrated.

The input unit 310 may further include at least one physical button such as a power on/off button separated from the touch panel.

Also, the input unit 310 may further include a jog dial mounted at the center fascia 125 and used to input a cursor movement command for moving a cursor displayed on the display unit 320 and a selection command.

The input unit 310 transmits a signal from the button selected by the user or from the jog dial to the controller 330 to the controller 330 and transmits a signal of a touch position of the touch panel to the controller 330.

That is, the input unit 310 transmits information input by the user to the controller 330.

The display unit 320 may display operation information in response to the command of the controller 330.

For example, while a navigation function is performed, the display unit 320 may display a map related to driving information, environmental information of roads, and route guidance information such that a current position of the vehicle is matched with the map and may also display an operation status and additional information.

The display unit 320 may also display information about phone calls, information about playing music, and external broadcasting signals as an image.

The display unit 320 may also display information related to speech recognition during speech recognition.

For example, the display unit 320 displays information about the recognized speech, information about the user's early utterance habit, and guidance information for speech recognition, and information about a re-request for utterance.

In this regard, the information about the recognized speech includes text information about the recognized speech, a device responding to the recognized speech, an operation command of the device, and the like.

When an operation command recognized by the speech recognition apparatus 200 is input via the communication unit 350, the controller 330 controls operation of the display unit 320 and the sound output unit 360 to perform operation corresponding to the received operation command.

When information about the speech recognized by the speech recognition apparatus 200 is received via the communication unit 350, the controller 330 may identify an operation command corresponding to the received information about the recognized speech and control operation of the display unit 320 and the sound output unit 360 to perform operation corresponding to the identified operation command.

In addition, when output commands for outputting the voice guidance information and the beep sound are received via the communication unit 350, the controller 330 controls the sound output unit 360 to output the voice guidance information and the beep sound.

The storage 340 stores an operation command corresponding to the recognized speech.

The communication unit 350 communicates with the speech recognition apparatus 200 in a wired or wireless network and transmits information received from the speech recognition apparatus 200 to the controller 330.

The communication unit 350 communicates with a global positioning system (GPS) receiver (not shown) and transmits the received current position to the controller 330.

Here, the GPS receiver receives position signals from a plurality of GPS satellites to compute a position of itself (i.e., the vehicle), and transmits the computed position of the vehicle to the communication unit 350.

In addition, the GPS receiver may include a GPS antenna (ANT) to receive signals from the plurality of GPS satellites, an accelerometer (not shown) to measure acceleration of the vehicle, and an orientation sensor (not shown) to sense orientation of the vehicle. The GPS receiver may also transmit acceleration data and orientation data together with the current position of the vehicle to the communication unit 350.

The communication unit 350 may communicate with external devices such as a smart phone and a server (not shown) in a wired or wireless network.

Here, the wired or wireless network includes TPEG such as DMB and a broadcasting network such as SXM and RDS.

The multimedia playback apparatus 300 may further include a port such as a universal serial bus (USB) port provided at a main body and the communication unit 350 may communicate with the speech recognition apparatus 200 connected via the port.

The communication unit 350 may further include a USB communication module and may transmit set-up programs or a variety of updated information to the controller 330 via the USB communication module.

When a navigation function is performed, the sound output unit 360 may output route and driving information using sound, output music selected by the user, and output sounds of an image.

The sound output unit 360 may output results of speech recognition or may output a counterpart's voice in a phone call mode.

The sound output unit 360 may be located at front and rear sides of the interior of the vehicle 1 as a speaker.

The sound output unit 360 may output voice guidance information and a beep sound while the speech recognition apparatus 200 performs speech recognition.

Figure 6A:
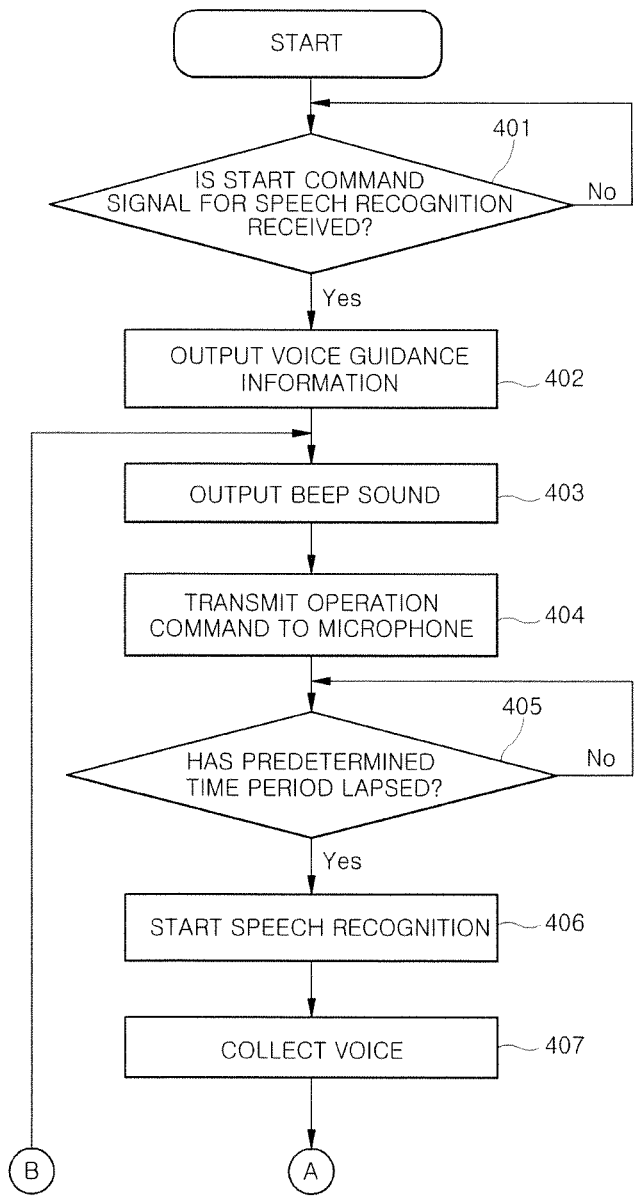
FIGS. 6A and 6B are flowcharts illustrating a method of controlling a speech recognition apparatus according to an exemplary embodiment.
Figure 6B:
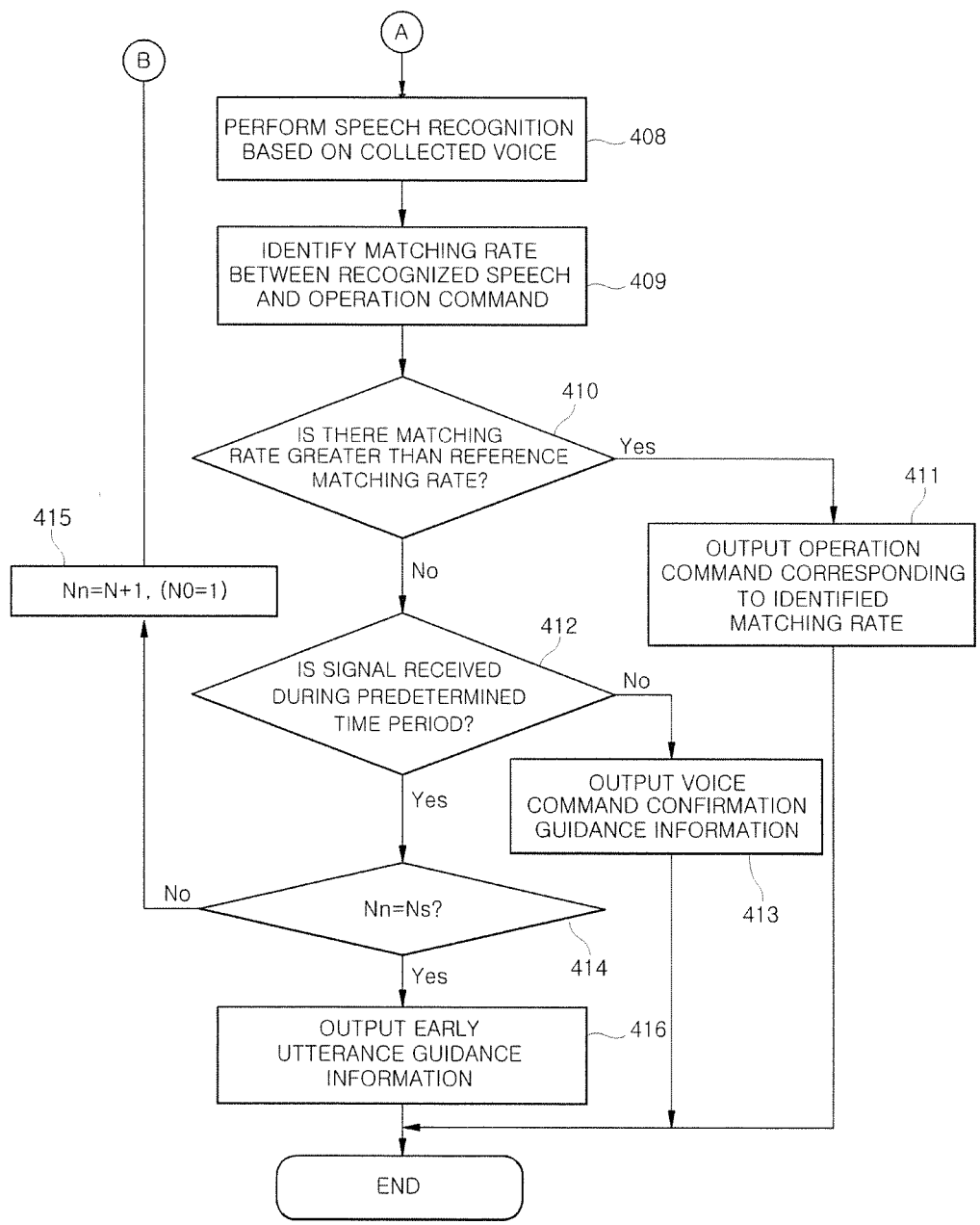

FIGS. 6A and 6B are flowcharts illustrating a method of controlling a speech recognition apparatus according to an exemplary embodiment.

The speech recognition apparatus 200 determines whether a start command signal for speech recognition output is received in response to an input of a start command for starting speech recognition (401). Upon determination that the start command signal for speech recognition output is received, the speech recognition apparatus 200 outputs voice guidance information to guide the user to speak after a beep sound upon determination that the start command signal for speech recognition is received (402).

Then, the speech recognition apparatus 200 outputs the beep sound to guide preparation of an utterance, after a predetermined time period from a time at which the voice guidance information is output (403).

Then, once the beep sound is output, the speech recognition apparatus 200 transmits an operation command to the microphone of the voice collection unit 220 (404). In this regard, the microphone of the voice collection unit 220 starts operation upon receiving the operation command.

Then, the speech recognition apparatus 200 determines whether a predetermined time period has lapsed after transmission of the operation command to the microphone (405). Upon determination that the predetermined time period has lapsed, the speech recognition apparatus 200 starts speech recognition upon determination that the predetermined time period has lapsed (406).

Here, the predetermined time period is a time period from a time at which the operation command is transmitted to the microphone to a time at which the microphone starts operation.

Then, after speech recognition is started, the speech recognition apparatus 200 collects voices by using the microphone of the voice collection unit 220 (407).

In this case, the microphone of the voice collection unit 220 detects sound waves of the collected voices, generates signals corresponding to the detected sound waves, and outputs the generated signals.

Then, the speech recognition apparatus 200 performs speech recognition based on the signals of the collected voices (408).

Here, the speech recognition apparatus 200 excludes signals of voices collected during a predetermined time period td from a start time of speech recognition t7 from signals of the collected voices for speech recognition, and recognizes voices by using signals of voices collected from a time ts after the predetermined time period td.

Figure 7:
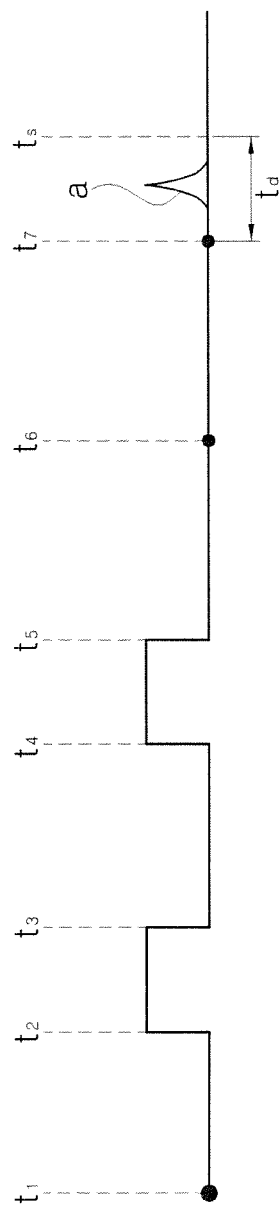
FIGS. 7 to 10 are timing diagrams illustrating times at which a speech recognition apparatus according to an exemplary embodiment receives signals.

As illustrated in FIG. 7, a noise signal a from hardware in the speech recognition apparatus 200 or a noise signal a from the interior and exterior of the vehicle 1 may be received during the predetermined time period td from the start time of speech recognition t7, and the speech recognition apparatus 200 processes the signal a as an NLS flag.

That is, the signals received during the predetermined time period td from the start time of speech recognition t7 are excluded from the signals for speech recognition since there is a high possibility that the signals received during the predetermined time period td from the start time of speech recognition t7 are noise signals from the inside hardware of the speech recognition apparatus 200 or noise signals from the interior and exterior of the vehicle 1.

The speech recognition apparatus 200 may perform speech recognition by using voice signals collected from a time ts after the predetermined time period by extracting feature vectors included in the voice signals via computation of frequency characteristics of the voice signals on a frame basis during speech recognition, identifying phonemes of the voice signals by comparing a vector sequence of the extracted feature vectors with that of a pre-stored acoustic model, and converting the identified phonemes into words constituting a context.

Then, the speech recognition apparatus 200 matches information about the recognized context with reference context information on the operation command basis to identify matching rates (409) and determines whether there is a matching rate greater than a reference matching rate among the identified matching rates (410).

Then, if the speech recognition apparatus 200 identifies reference context information having a matching rate greater than the reference matching rate, the speech recognition apparatus 200 identifies an operation command corresponding to the identified reference context information and outputs the identified operation command (411).

When a signal received during the predetermined time period td from the start time of speech recognition t7, the speech recognition apparatus 200 recognizes the signal received during the predetermined time period td from the start time of speech recognition t7 as a noise signal.

This will be described with reference to FIGS. 8 and 9.

Figure 8:
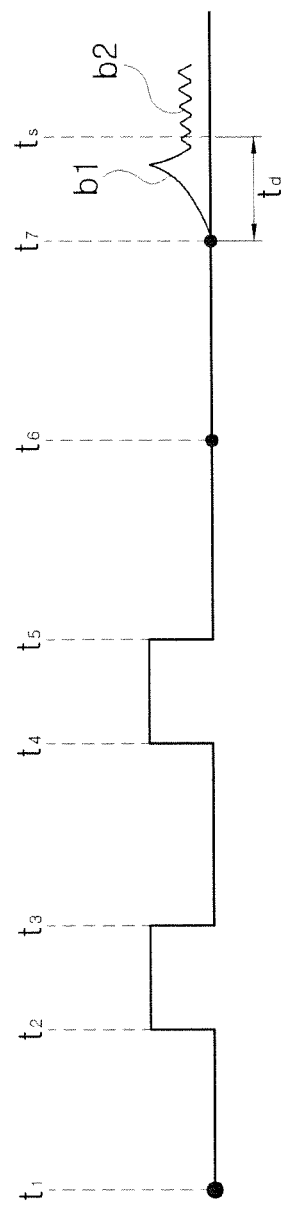

As illustrated in FIG. 8, when a matching rate greater than the reference matching rate is found among the identified matching rates and a signal is received during the predetermined time period td from the start time of speech recognition t7, the speech recognition apparatus 200 recognizes a signal b1 received during the predetermined time period td from the start time of speech recognition t7 as a noise signal and recognizes a signal b2 received from a time ts after the predetermined time period td as a voice signal.

That is, the speech recognition apparatus 200 performs speech recognition by using the signal b2 received from the time ts after the predetermined time period td.

Figure 9:
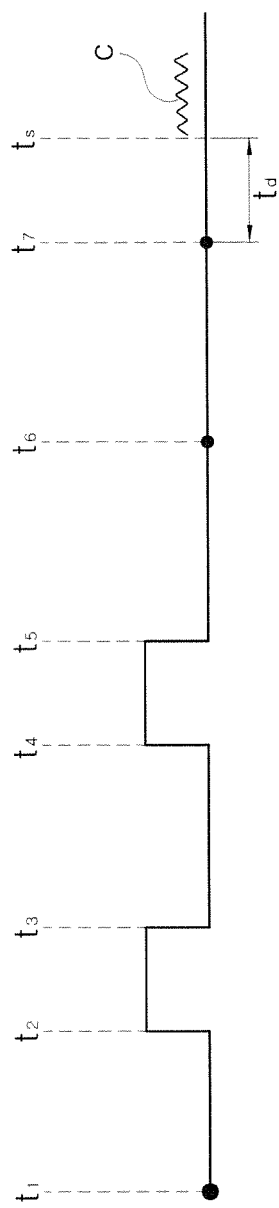

As illustrated in FIG. 9, when a matching rate greater than the reference matching rate is found among the identified matching rates and a signal is not received during the predetermined time period td from the start time of speech recognition t7, the speech recognition apparatus 200 determines that a voice signal c corresponding to a voice command is only received from the time ts after the predetermined time period td while a noise signal is not received during the predetermined time period td from the start time of speech recognition t7.

On the other hand, when a matching rate greater than the reference matching rate is not found among the identified matching rates, the speech recognition apparatus 200 determines whether a speech recognition failure (i.e., misrecognition) occurs by the early utterance of the user or a command error occurs by the user.

To this end, the speech recognition apparatus 200 determines whether a signal is received during the predetermined time period td from the start time of speech recognition t7 (412), determines a command error occurs by the user upon determination that the signal is not received, and outputs voice command confirmation guidance information to guide the user to confirm the voice command (413).

However, upon determination that a signal is received during the predetermined time period td from the start time of speech recognition t7, the speech recognition apparatus 200 determines that a speech recognition failure occurs by the early utterance of the user.

Figure 10:
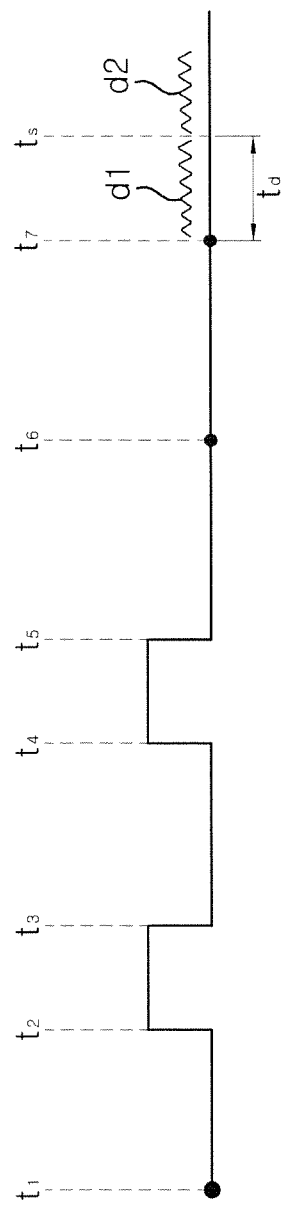

As illustrated in FIG. 10, when a matching rate greater than the reference matching rate is found among the identified matching rates and a signal is received during the predetermined time period td from the start time of speech recognition t7, the speech recognition apparatus 200 recognizes a signal d1 received during the predetermined time period td from the start time of speech recognition t7 as a signal of a speech recognition failure occurring by the early utterance and recognizes a signal d2 received from a time ts after the predetermined time period td as a voice signal.

Upon determination that the speech recognition failure occurs by the early utterance, the speech recognition apparatus 200 re-requests the user to perform speech recognition in order to determine whether the early utterance occurs due to a mistake or a habit of the user.

In addition, the speech recognition apparatus 200 counts a number of times of speech recognition failure due to early utterance. The number of times of speech recognition failure occurring once due to the early utterance N0 is 1, and the number of times of speech recognition occurring thereafter Nn is 2 by adding 1 thereto.

The speech recognition apparatus 200 guides the user to speak a voice command again when speech recognition is re-performed due to the early utterance. In this regard, the speech recognition apparatus outputs the beep sound.

Then, the speech recognition apparatus 200 transmits an operation command to the microphone of the voice collection unit, starts speech recognition after a predetermined time period from a time at which the operation command is transmitted to the microphone, and performs speech recognition based on signals of voices collected by the microphone.

Also, the speech recognition apparatus 200 excludes signals of voices collected during a predetermined time period td from the start time of speech recognition t7 from signals of the collected voices for speech recognition, and recognizes voices by using signals of voices collected from a time is after the predetermined time period td.

The speech recognition apparatus 200 requests the user to re-perform speech recognition based on whether or not the speech recognition is successful and repeats adding the number of times of speech recognition to the count.

The speech recognition apparatus 200 identifies the total number of times of the speech recognition failure and compares the identified number of times Nn with the reference number of times Ns (414). When the identified number of times Nn is less than the reference number of times Ns, the number of speech recognition failure is added to the count (415), and speech recognition is repeated.

Here, the reference number of times may be two.

When the identified number of times of speech recognition failure is the same as the reference number of times, the speech recognition apparatus 200 determines that early utterance of the user is caused by the user's habit, outputs early utterance guidance information regarding the habit of early utterance (416), and terminates re-performing of speech recognition.

Figure 11:
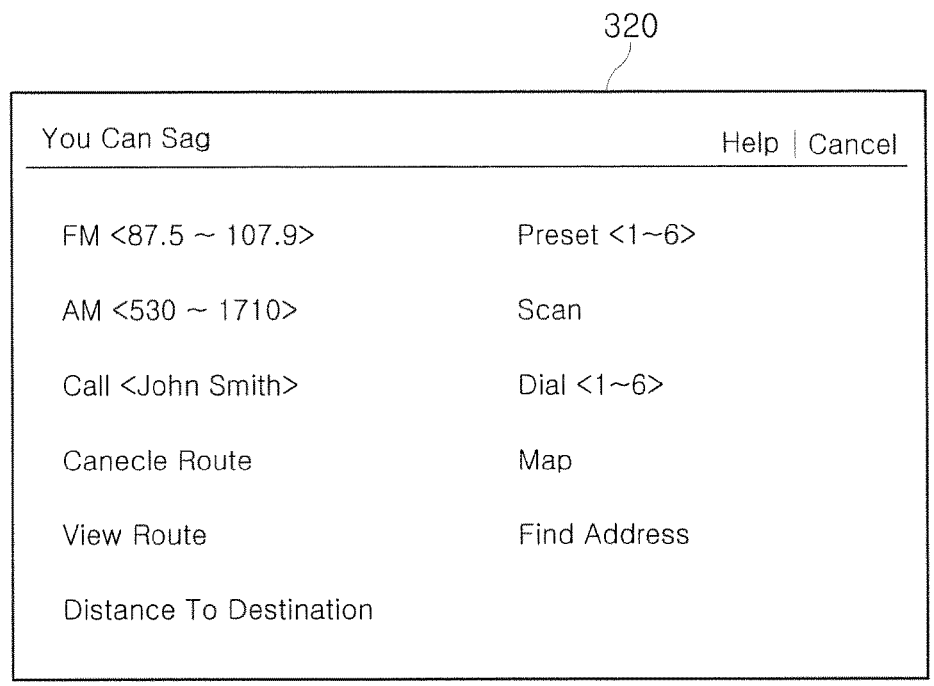
FIG. 11 is an exemplary view of displaying speech recognition of a multimedia playback apparatus communicating with a speech recognition apparatus according to an exemplary embodiment.
Figure 12:
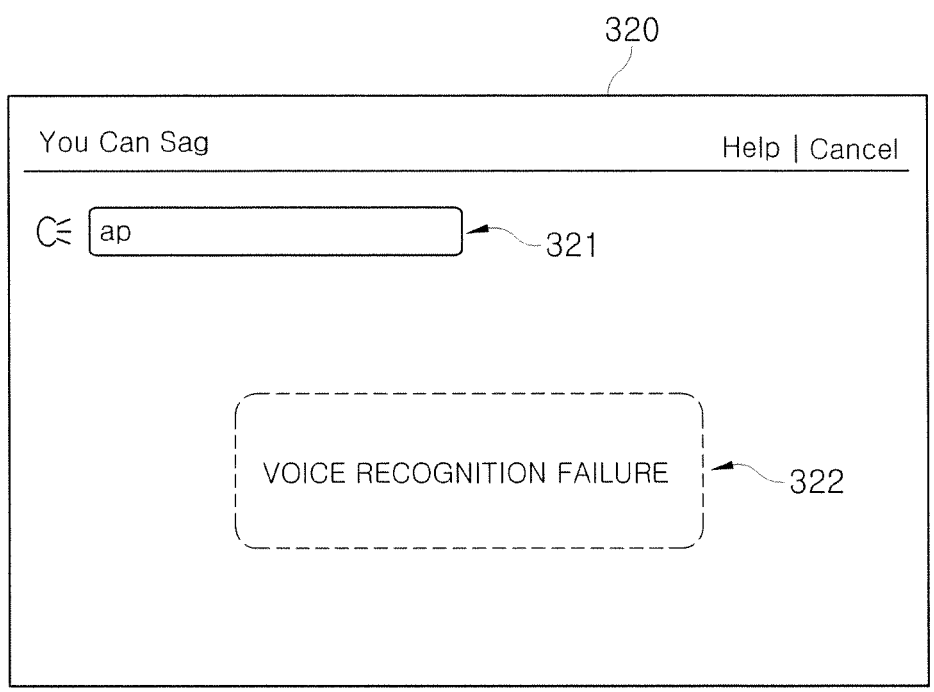
FIG. 12 is an exemplary view of displaying results of speech recognition of a multimedia playback apparatus communicating with a speech recognition apparatus according to an exemplary embodiment.

FIGS. 11 to 13 are exemplary view illustrating a display of a multimedia playback apparatus communicating with a speech recognition apparatus according to an exemplary embodiment.

As illustrated in FIG. 11, when the start command signal for speech recognition is received from the speech recognition apparatus 200, the multimedia playback apparatus 300 displays a list of operation performed by user's speech recognition by using the display unit 320.

As illustrated in FIG. 12, the multimedia playback apparatus 300 displays information of a speech recognized by the speech recognition apparatus 200 as text on a recognition window 321.

Accordingly, the user may confirm the results of speech recognition by an utterance of the user.

In addition, the multimedia playback apparatus 300 displays information about the results of speech recognition such as the success and failure of speech recognition on a display window 322.

Accordingly, the user may confirm the success or failure of speech recognition.

As illustrated in FIG. 13, the display unit 320 of the multimedia playback apparatus 300 displays early utterance guidance information regarding early utterance on a guidance window 323.

The multimedia playback apparatus 300 may also output the early utterance guidance information as a sound via the sound output unit 360.

Since information about the early utterance habit is guided to the user as described above for easy recognition, the user may correct the early utterance habit.

Although information about speech recognition is displayed on the display unit of the multimedia playback apparatus according to an exemplary embodiment, the information about speech recognition may also be displayed on a display unit (not shown) provided at the speech recognition apparatus.

As is apparent from the above description, a speech recognition apparatus according to an exemplary embodiment may have high speech recognition rates by correcting an early utterance habit of a user by determining whether an early utterance occurs during speech recognition, and informing the user of an early utterance habit upon determination that early utterance occurs.

According to an exemplary embodiment, a voice signal from an early utterance may be distinguished from a noise signal from hardware based on the speech recognition rates, and thus accuracy of determining an early utterance habit may be increased.

Also, the speech recognition rates may be increased by re-requesting an utterance after a speech recognition failure occurs and re-performing speech recognition, and accuracy of controlling operation of an external device via speech recognition may be improved.

Accordingly, quality of devices installed in the vehicle, operation of which is controlled via speech recognition, such as a multimedia playback apparatus may be improved, and thus satisfaction and convenience of the user and safety of the vehicle may be improved.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A speech recognition apparatus comprising:
a voice collection unit configured to collect voices; and
a controller configured to control recognizing a speech based on signals of the voices collected by the voice collection unit during a predetermined time period from a voice collection start time, identify whether a signal is received during the predetermined time period when an operation command corresponding to the recognized speech is not identified, generate a No Leading Silence (NLS) flag upon identifying that the signal is received, determine that a speech recognition failure occurs by an early utterance when a number of times NLS flag is generated is the same as a reference number of times, and output information corresponding to the speech recognition failure by the early utterance,
wherein the controller controls re-requesting speech recognition when the generated NLS flag number of times is less than the reference number of times, and outputting early utterance habit guidance information when the generated NLS flag number of times is the same as the reference number of times.

2. The speech recognition apparatus according to claim 1, further comprising an input unit configured to receive a start command for starting speech recognition,
wherein the controller outputs utterance instruction guidance information and an operation command for operating the voice collection unit upon receiving the start command signal for speech recognition.

3. The speech recognition apparatus according to claim 1, wherein when the operation command corresponding to the recognized speech is not identified and a signal is not received during the predetermined time period, the controller outputs information about a command error.

4. The speech recognition apparatus according to claim 1, wherein the controller controls outputting the identified operation command upon identifying the operation command corresponding to the recognized speech.

5. The speech recognition apparatus according to claim 4, wherein when the operation command corresponding to the recognized speech is identified and a signal is received during the predetermined time period, the controller processes the signal received during the predetermined time period as a noise.

6. The speech recognition apparatus according to claim 1, wherein the controller controls outputting a beep sound in the re-requesting of speech recognition.

7. A vehicle comprising:
a speech recognition apparatus; and
at least one device, operation of which is controlled based on an operation command corresponding to a speech recognized by the speech recognition apparatus,
wherein the speech recognition apparatus comprises:
a voice collection unit configured to collect voices; and
a controller configured to control recognizing a speech based on signals of the voices collected by the voice collection unit during a predetermined time period from a voice collection start time, identify whether a signal is received during the predetermined time period when an operation command corresponding to the recognized speech is not identified, generate a No Leading Silence (NLS) flag upon identifying that the signal is received, determine that a speech recognition failure occurs by an early utterance when a number of times NLS flag is generated is the same as a reference number of times, and output information corresponding to the speech recognition failure by the early utterance,
wherein the controller controls re-requesting speech recognition when the generated NLS flag number of times is less than the reference number of times, and output early utterance habit guidance information when the generated NLS flag number of times is the same as the reference number of times.

8. The vehicle according to claim 7, wherein the speech recognition apparatus further comprises an input unit configured to receive a start command for starting speech recognition,
wherein the controller sequentially controls outputting voice guidance information for guiding an utterance instruction process, outputting a beep sound to guide a time for preparing an utterance, and outputting an operation command for operating the voice collection unit upon receiving the start command signal for speech recognition.

9. The vehicle according to claim 7, wherein the controller recognizes a time after a predetermined time period from a time at which the operation command for operating the voice collection unit is output as a voice collection start time, and starts receiving signals of the collected voice.

10. The vehicle according to claim 7, wherein when the operation command corresponding to the recognized speech is identified, the controller controls outputting the identified operation command to the at least one device.

11. The vehicle according to claim 7, wherein when the operation command corresponding to the recognized speech is identified and a signal is received during the predetermined time period, the controller processes the signal received during the predetermined time period as a noise, and
when the operation command corresponding to the recognized speech is not identified and a signal is not received during the predetermined time period, the controller determines that a command error occurs and controls outputting information about the command error to the at least one device.

12. The vehicle according to claim 7, wherein the controller controls outputting the early utterance habit guidance information by estimating occurrence of no leading silence (NLS) by early utterance when the generated NLS flag number of times is one and confirming occurrence of NLS by early utterance when the generated NLS flag number of times is two.

13. The vehicle according to claim 7, further comprising a display unit configured to display the early utterance habit guidance information.

14. A method of controlling a speech recognition apparatus configured to receive a command to control operation of a plurality of devices installed in a vehicle, the method comprising:
determining whether a start command signal for speech recognition is received;
operating a voice collection unit upon determination that the start command signal for speech recognition is received;
determining whether a predetermined time period has lapsed from a voice collection start time;
recognizing a speech based on signals of voices collected from a time after the predetermined time period;
identifying an operation command corresponding to the recognized speech;
identifying whether a signal is received during the predetermined time period when the operation command corresponding to the recognized speech is not identified;
generating a No Leading Silence (NLS) flag upon identifying that the signal is received, determining that a speech recognition failure occurs by an early utterance when a number of times NLS flag is generated is the same as a reference number of times;
outputting information corresponding to the speech recognition failure by the early utterance; and
counting a number of times of the speech recognition failure by the early utterance, outputting a beep sound to re-perform speech recognition when the generated NLS flag number of times is less than the reference number of times, and outputting early utterance habit guidance information when the generated NLS flag number of times is the same as the reference number of times.

15. The method according to claim 14, further comprising outputting voice guidance information for guiding an utterance instruction process upon receiving the start command signal for speech recognition;
outputting a beep sound to guide a time for preparing an utterance when the outputting of the voice guidance information is complete;
outputting an operation command for operating the voice collection unit when the outputting of the beep sound is complete; and recognizing a time after a predetermined time period from a time at which the operation command for operating the voice collection unit is output as a voice collection start time.

16. The method according to claim 14, further comprising outputting the identified operation command to one of the plurality of devices installed in the vehicle when the operation command corresponding to the recognized speech is identified.

17. The method according to claim 14, further comprising processing a signal received during the predetermined time period as a noise when the operation command corresponding to the recognized speech is identified and the signal is received during the predetermined time period.

* * * * *